US008768605B2

(12) United States Patent
Heaps et al.

(10) Patent No.: US 8,768,605 B2
(45) Date of Patent: Jul. 1, 2014

(54) RUSH HOUR MODELING FOR ROUTING AND SCHEDULING

(71) Applicant: Roadnet Technologies, Inc., Baltimore, MD (US)

(72) Inventors: Charles Heaps, Eldersburg, MD (US); Clifton Kraisser, Ellicott City, MD (US); Ralph Clementi, Clarksville, MD (US); Thomas Mudd, Baldwin, MD (US); Stephen Simon, Sparks, MD (US); Francis McClellan, Whitehall, MD (US)

(73) Assignee: Roadnet Technologies Inc., Baltimore, MD (US)

( * ) Notice: Subject to any disclaimer, the term of this patent is extended or adjusted under 35 U.S.C. 154(b) by 0 days.

(21) Appl. No.: 13/871,554

(22) Filed: Apr. 26, 2013

(65) Prior Publication Data
US 2013/0245926 A1    Sep. 19, 2013

Related U.S. Application Data

(60) Continuation of application No. 12/236,306, filed on Sep. 23, 2008, now Pat. No. 8,433,511, which is a division of application No. 10/828,850, filed on Apr. 15, 2004, now abandoned.

(60) Provisional application No. 60/463,180, filed on Apr. 15, 2003.

(51) Int. Cl.
G01C 21/28    (2006.01)

(52) U.S. Cl.
USPC ............ 701/117; 701/422; 701/423; 701/465

(58) Field of Classification Search
USPC ......... 701/408, 411, 414–416, 422, 423, 533, 701/23; 340/988–996; 705/22, 401
See application file for complete search history.

(56) References Cited

U.S. PATENT DOCUMENTS

| 6,507,850 | B1 | 1/2003 | Livshutz et al. |
| 6,741,926 | B1 * | 5/2004 | Zhao et al. ................. 701/468 |
| 2001/0029425 | A1 * | 10/2001 | Myr ............................. 701/200 |

OTHER PUBLICATIONS

Roadnet 5000 Operations Guide—Version 7.0, UPS logistics technologies, 2001, pp. 20, 29, 59-81, 107, 112, 173-211,305.*
Communication, Official Action from the Canadian Intellectual Property Office, Notification "Of a Requisition by the Examiner in Accordance with Subsection 30(2) of the Patent Rules", in Canadian Application No. 2,250,212 dated Jun. 12, 2013 (18 pages).

* cited by examiner

*Primary Examiner* — Thomas Tarcza
*Assistant Examiner* — Adam Tissot
(74) *Attorney, Agent, or Firm* — Goodwin Procter LLP

(57) ABSTRACT

A rush hour modeling system that is configured for modifying existing travel time/distance data to reflect special traffic conditions, such as rush hour traffic conditions. The system is configured to receive information defining one or more time windows, geographic areas, and road segments in which special traffic conditions occur. The system is also configured to receive travel rules that reflect the special traffic conditions. The travel rules are used to modify a travel time/distance matrix to reflect the effect of the special traffic conditions on "normal" travel times and distances. Existing routing and scheduling systems can then use the modified travel matrix to plan and schedule routes for delivery vehicles more accurately. Additionally, the modified travel matrix can be used to model traffic conditions through a particular geographic area or on a particular road segment.

30 Claims, 17 Drawing Sheets

SAMPLE SET OF MODIFIED RUSH HOUR TRAVEL SPEEDS

| GEOGRAPHIC AREA/ROAD SEGMENT | NORMAL TRAVEL SPEED | TRAVEL SPEED DURING TIME WINDOW #1 | TRAVEL SPEED DURING TIME WINDOW #2 | TRAVEL SPEED DURING TIME WINDOW #3 |
|---|---|---|---|---|
| ROAD 1 IN AREA 1 | 45 mph | 31.5 mph (30% SLOWER) | 36 mph (20% SLOWER) | 31.5 mph (30% SLOWER) |
| ROAD 2 IN AREA 1 | 50 mph | 35 mph (30% SLOWER) | 40 mph (20% SLOWER) | 35 mph (30% SLOWER) |
| ROAD SEGMENT X | 30 mph | 20 mph (30% SLOWER) | 0 mph (TRAVEL RESTRICTION) | 20 mph (30% SLOWER) |
| ROAD SEGMENT Y | 65 mph | 45.5 mph (30% SLOWER) | 0 mph (TRAVEL RESTRICTION) | 45.5 mph (30% SLOWER) |
| ALL AREAS AND ROADS TO WHICH NO NEW TRAFFIC RULES WERE DEFINED TO APPLY. | NORMAL SPEED | NORMAL SPEED | NORMAL SPEED | NORMAL SPEED |

FIG. 1

TRAVEL MATRIX FOR "NORMAL" TRAFFIC CONDITIONS

|            | LOCATION 1           | LOCATION 2          | LOCATION 3          | LOCATION 4           |
|------------|----------------------|---------------------|---------------------|----------------------|
| LOCATION 1 | ----                 | 10 minutes / 2 miles | 15 minutes / 3 miles | 20 minutes / 4 miles |
| LOCATION 2 | 10 minutes / 2 miles | ----                | 5 minutes / 1 mile  | 10 minutes / 2 miles |
| LOCATION 3 | 15 minutes / 3 miles | 5 minutes / 1 mile  | ----                | 5 minutes / 1 mile   |
| LOCATION 4 | 20 minutes / 4 miles | 10 minutes / 2 miles | 5 minutes / 1 mile  | ----                 |

*FIG. 2A*

TRAVEL MATRIX FOR A PARTICULAR TIME WINDOW WITH A 20% SLOWER SPEED VARIATION

|            | LOCATION 1           | LOCATION 2           | LOCATION 3          | LOCATION 4           |
|------------|----------------------|----------------------|---------------------|----------------------|
| LOCATION 1 | ----                 | *15 minutes* / *3 miles* | 18 minutes / 3 miles | 24 minutes / 4 miles |
| LOCATION 2 | *15 minutes* / *3 miles* | ----             | 6 minutes / 1 mile  | *15 minutes* / *2 miles* |
| LOCATION 3 | 18 minutes / 3 miles | 6 minutes / 1 mile   | ----                | 6 minutes / 1 mile   |
| LOCATION 4 | 24 minutes / 4 miles | *15 minutes* / *2 miles* | 6 minutes / 1 mile | ----                 |

| RUSH HOUR AREA ATTRIBUTES-WINTER | | | |
|---|---|---|---|
| Name | Description | | Priority |
| Metro Baltimore | Area enclosing Balt. Beltway | | 0 |

○ Simple  ● Advanced

| SPEED VARIATION | ADVANCED SPEED VARIATION | TRAVEL RESTRICTION |

| Road Class | Morning 1308<br>06:00 - 09:00 | Midday<br>Not Enabled | Afternoon<br>16:00 - 19:00 |
|---|---|---|---|
| Interstate | ☐ Restricted 1310 | ☐ Restricted | ☐ Restricted |
| Primary | ☑ Restricted | ☐ Restricted | ☑ Restricted |
| Secondary | ☑ Restricted | ☐ Restricted | ☑ Restricted |
| Local and Ramps | ☑ Restricted | ☐ Restricted | ☑ Restricted |
| | All | All | All |

1312 — A check on this page means restricted equipment types cannot use roads of that class during that time period.

[ OK ] [ CANCEL ]

FIG. 15

RUSH HOUR MODELING FOR ROUTING AND SCHEDULING

CROSS-REFERENCE TO RELATED APPLICATIONS

This application is a continuation of U.S. patent application Ser. No. 12/236,306, filed Sep. 23, 2008, issuing as U.S. Pat. No. 8,433,511, which is a divisional of U.S. application Ser. No. 10/828,850, filed Apr. 15, 2004, which claims benefit to U.S. Provisional Application No. 60/463,180, filed Apr. 15, 2003, the contents of each of the aforementioned are incorporated herein by reference.

BACKGROUND OF THE INVENTION

It is known that traffic levels increase during certain parts of the day. For example, traffic levels typically increase between 7:30 am and 9:00 am, when many commuters are traveling to work, and again from 5:00 pm to 7:00 pm, when many commuters are traveling home. These increased "rush hour" traffic levels have not been adequately addressed by existing routing and scheduling systems. Accordingly, improved logistics systems are needed that model rush hour conditions and allow logistics planners to route vehicles efficiently to account for rush hour conditions.

BRIEF SUMMARY OF THE INVENTION

A system according to one embodiment of the invention is configured to receive, from a user: (1) a time window; (2) "geographic area" information that defines a geographic area; and (3) a travel rule that is to apply to the geographic area during the time window. After the time window, "geographic area" information, and the travel rule are received, the system applies the travel rule to the geographic area to schedule a route for one or more vehicles traveling during the time window. In an alternative embodiment, the system applies the travel rule to the geographic area to determine whether to schedule a route for one or more vehicles through at least a portion of the geographic area during the time window. In another embodiment, the system applies the travel rule to the geographic area to model the speed of travel of one or more vehicles traveling through the geographic area during the time window. In a further embodiment, the system can receive more than one time window and travel rule, and information that defines more than one geographic area.

A system according to another embodiment of the invention is configured to receive from a user: (1) a time window, (2) "geographic area" information that defines a geographic area, and (3) a travel rule that is to apply to the geographic area during the time window. After receiving the time window, "geographic area" information, and the travel rule, the system applies the travel rule to the geographic area to generate a travel matrix that models traffic conditions within the geographic area during the time window. This travel matrix is then utilized to schedule a route for one or more vehicles when said one or more vehicles are scheduled to travel within the time window. In a further embodiment, the system can receive more than one time window and travel rule, and information that defines more than one geographic area.

A system according to another embodiment of the invention is configured to receive from a user: (1) a first geographic area and a first travel rule that is associated with the first geographic area, (2) a second geographic area that at least partially overlaps the first geographic area defining an overlapped geographic area, and (3) a second travel rule that is associated with the second geographic area. After receiving the first and second geographic areas and the first and second travel rules, the system determines whether the first or the second travel rule should be applied to one or more vehicles traveling through at least a portion of the overlapped geographic area. If the system determines that the first travel rule should be applied to vehicles traveling within the overlapped geographic area, then the system applies the first travel rule to model traffic conditions for vehicles traveling through at least a portion of the overlapped geographic area, if the system determines that the second travel rule should be applied to vehicles traveling within the overlapped geographic area, then the system applies the second travel rule to model traffic conditions for vehicles traveling through at least a portion of the overlapped geographic area. In an alternative embodiment, the system applies the appropriate travel rule to the overlapped geographic area to determine whether to schedule a route for vehicles through the overlapped geographic area.

A system according to another embodiment of the invention is configured to receive from a user: (1) a time window, (2) "road segment" information that defines a road segment, and (3) a direction of travel restriction that is to apply to the road segment during the time window. After receiving the "road segment" information and the direction of travel restriction, the system applies the direction of travel restriction to the road segment to schedule one or more routes so that substantially no route includes travel by one or more vehicles in the restricted direction of travel on the road segment during the time window. In a further embodiment, the system can receive more than one time window, more than one direction of travel restriction, and information that defines more than one road segment.

A system according to yet another embodiment of the invention is configured to receive from a user: (1) a time window, (2) "road segment" information that defines a road segment, and (3) a vehicle based restriction that is to apply to the road segment during the time window. After receiving the "road segment" information and the vehicle based restriction, the system applies the vehicle based restriction to schedule one or more routes so that substantially no route includes travel on the road segment during the time window by one or more vehicles that satisfy the criteria for the vehicle based restrictions. In a further embodiment, the system can receive more than one time window, more than one vehicle based restriction, and information that defines more than one road segment.

A system according to another embodiment of the invention is configured to receive from a user: (1) a time window, (2) "road segment" information that defines a road segment, and (3) a speed variation model that is to apply to the road segment during the time window. After receiving the "road segment" information and the speed variation model, the system applies the speed variation model to schedule one or more routes. In a further embodiment, the system can receive more than one time window, more than one speed variation model, and information that defines more than one road segment.

A system according to another embodiment of the invention is configured to receive from a user: (1) "geographic area" information that defines a geographic area, (2) a "no travel" time window for the geographic area, and (3) "no travel" instructions that specify that substantially no vehicles should be scheduled to travel within the geographic area during the "no travel" time window. After receiving the "geographic area" information, the "no travel" time window, and the "no travel" instructions, the system schedules vehicles so that substantially no vehicles are scheduled to travel within the geographic area during the "no travel" time window. In a further embodiment, the system can receive more than one "no travel" time window, more than one set of "no travel" instructions, and information that defines more than one geographic area.

A system according to another embodiment of the invention is configured to receive from a user: (1) "geographic area" information that defines a geographic area, (2) a first speed variation model that is to apply to a first road classification within the geographic area, and (3) a second speed variation model that is to apply to a second road classification within the geographic area. After receiving the "geographic area" information, the first speed variation model, and the first road classification, the system applies the first speed variation model to estimate travel times associated with vehicles traveling on roads of the first classification through at least a portion of the geographic area. Additionally, after receiving the "geographic area" information, the second speed variation model, and the second road classification, the system applies the second speed variation model to estimate travel times associated with vehicles traveling on roads of the second classification through at least a portion of the geographic area.

A system according to another embodiment of the invention is configured to receive from a user: (1) a time window, (2) a road segment classification, and (3) a travel rule that is to apply to road segments that are assigned to the road segment classification during the time window. After receiving the time window, the road segment classification, and the travel rule, the system applies the travel rule to road segments assigned to the road segment classification to schedule a route for one or more vehicles during the time window. In a further embodiment, the system can receive more than one time window, more than one travel rule, and information that defines more than one road segment.

BRIEF DESCRIPTION OF THE DRAWINGS

Having thus described the invention in general terms, reference will now be made to the accompanying drawings, which are not necessarily drawn to scale, and wherein:

FIG. 1 is a table illustrating a sample set of modified rush hour travel speeds.

FIG. 2A is a table illustrating a travel matrix for "normal" traffic conditions.

FIG. 2B is a table illustrating a travel matrix for modified traffic conditions during a particular time window with a 20% slower speed variation.

Figure 3:
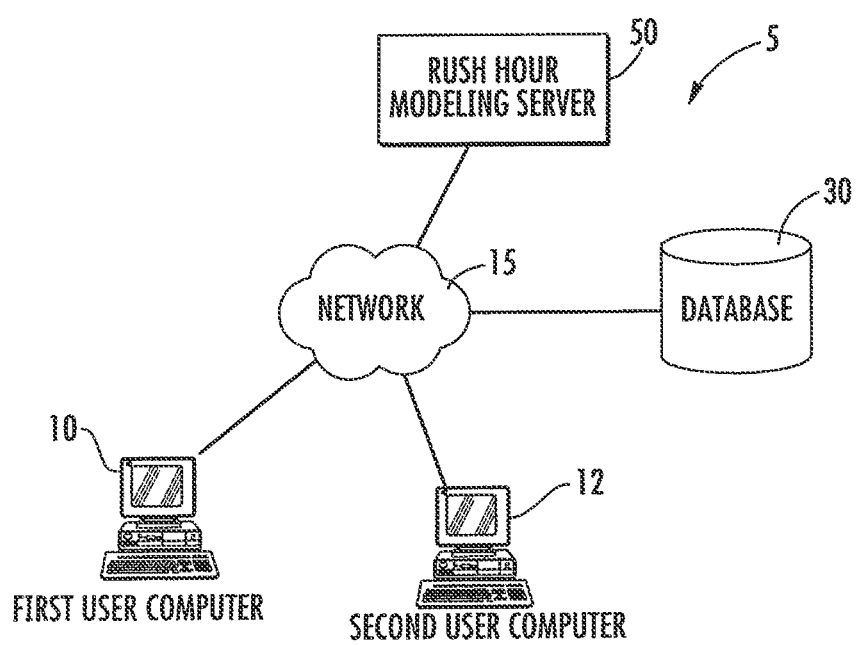

FIG. 3 is a first block diagram of a rush hour scheduling system according to an embodiment of the present invention.

Figure 4:
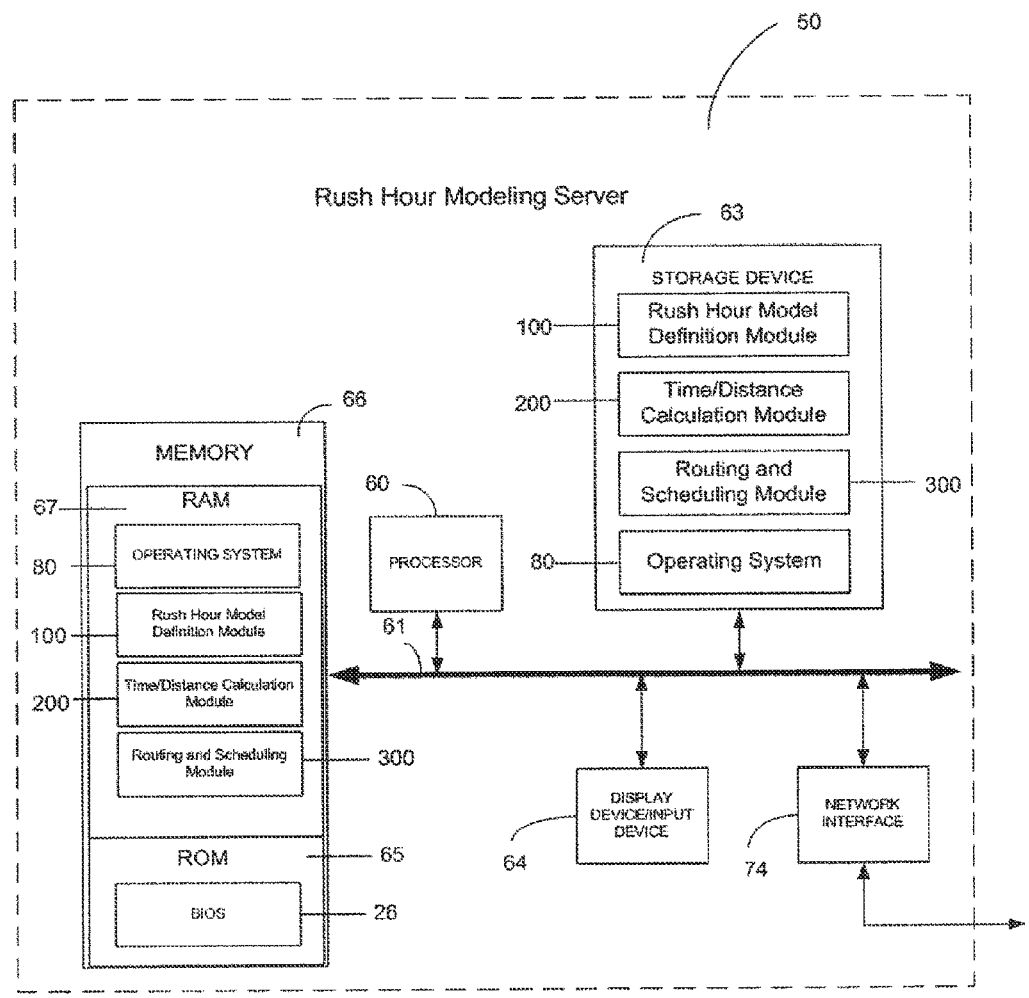

FIG. 4 is a diagram of a Rush Hour Modeling Server according to one embodiment of the present invention.

Figure 5:
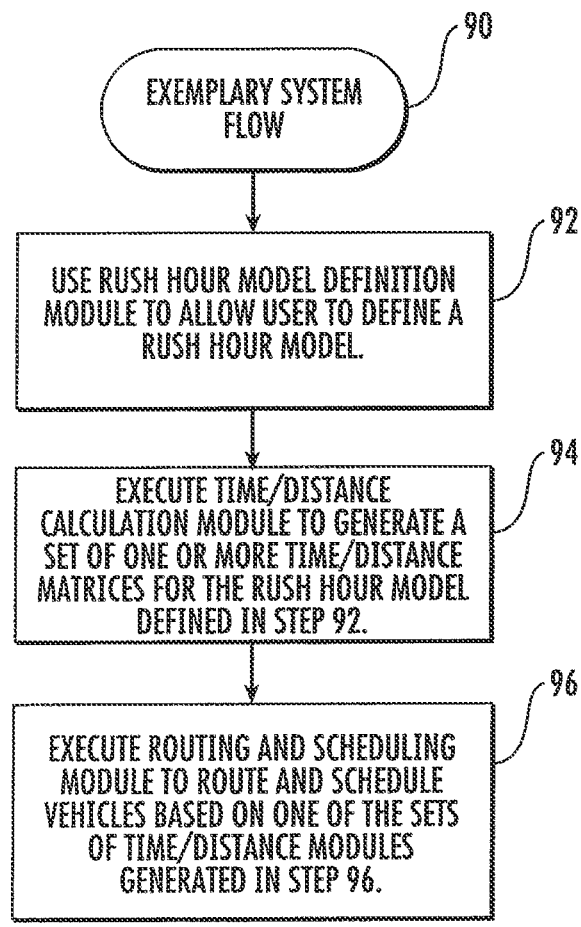

FIG. 5 depicts the system flow of a rush hour modeling system according to one embodiment of the invention.

Figure 6:
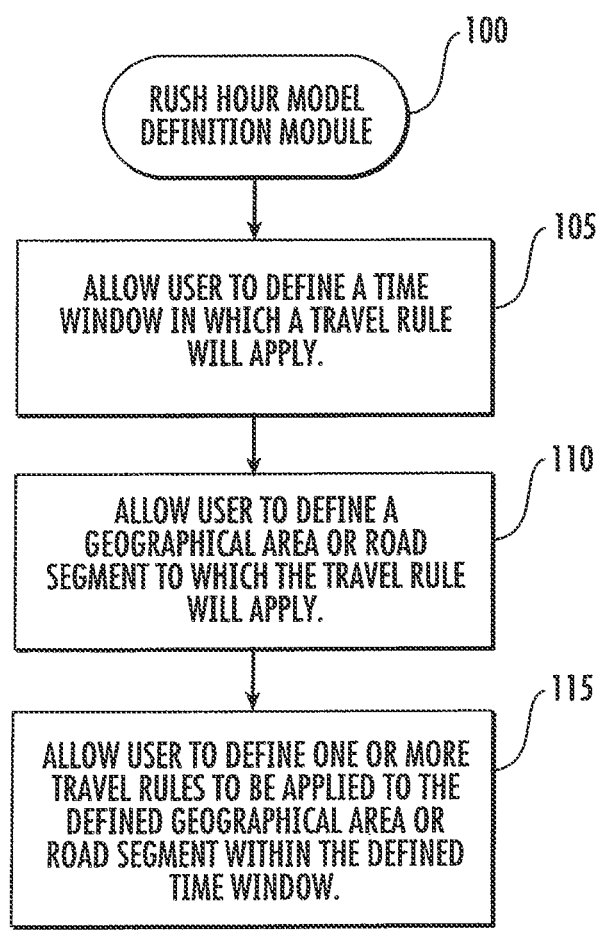

FIG. 6 is a flowchart that illustrates various steps executed by a rush hour model definition module according to a particular embodiment of the invention.

Figure 7:
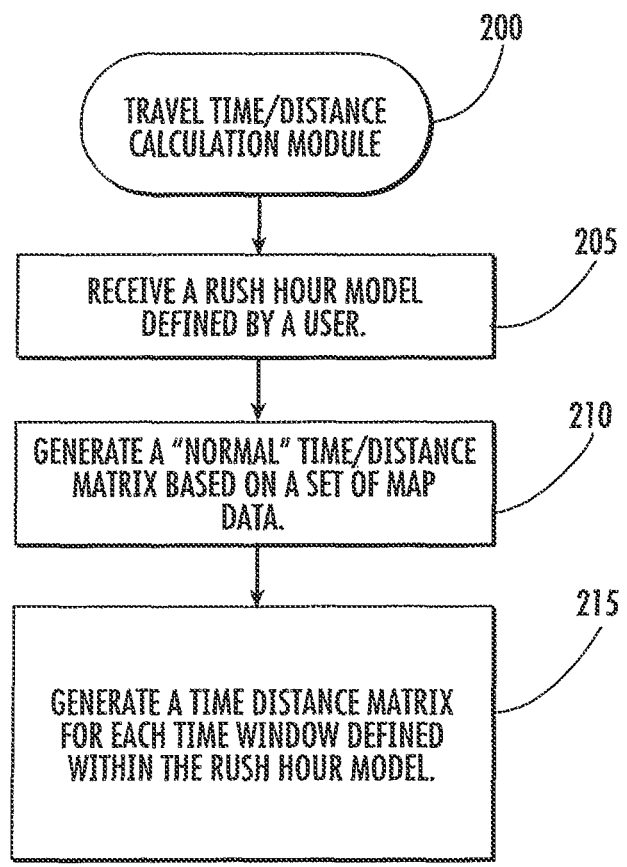

FIG. 7 is a flowchart that illustrates various steps executed by a travel time/distance calculation module according to a particular embodiment of the invention.

FIG. 8 is a graphic illustration of an exemplary rush hour modeling dialog window for defining time windows and global speed variations.

Figure 9:
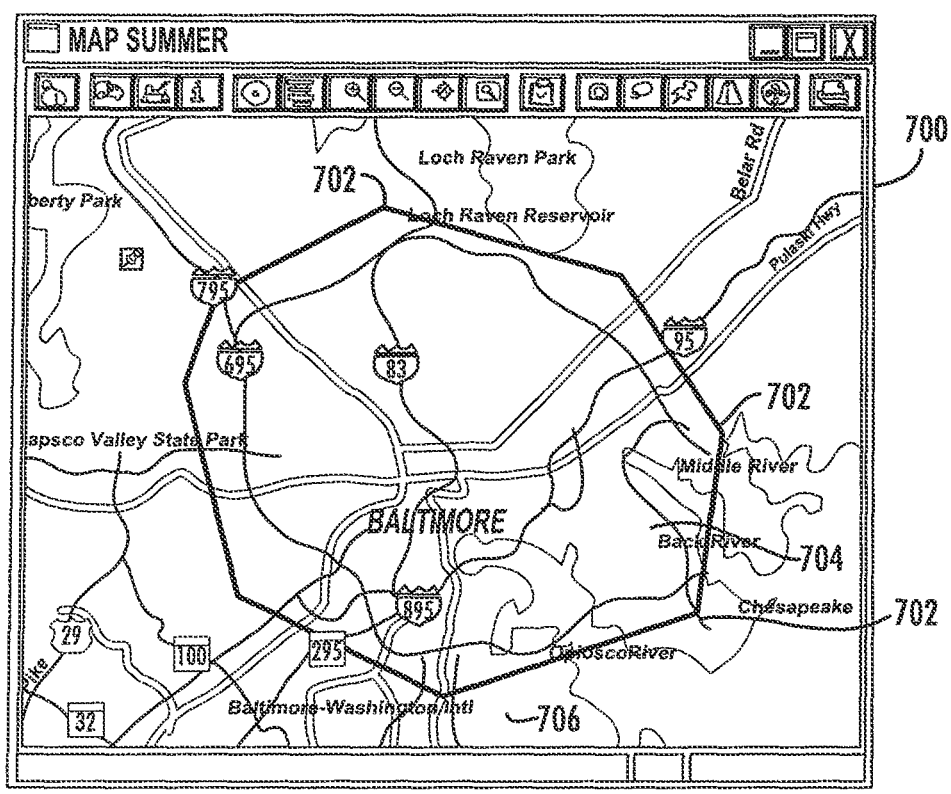

FIG. 9 is a graphic illustration of an exemplary geographic area selection window.

Figure 10:
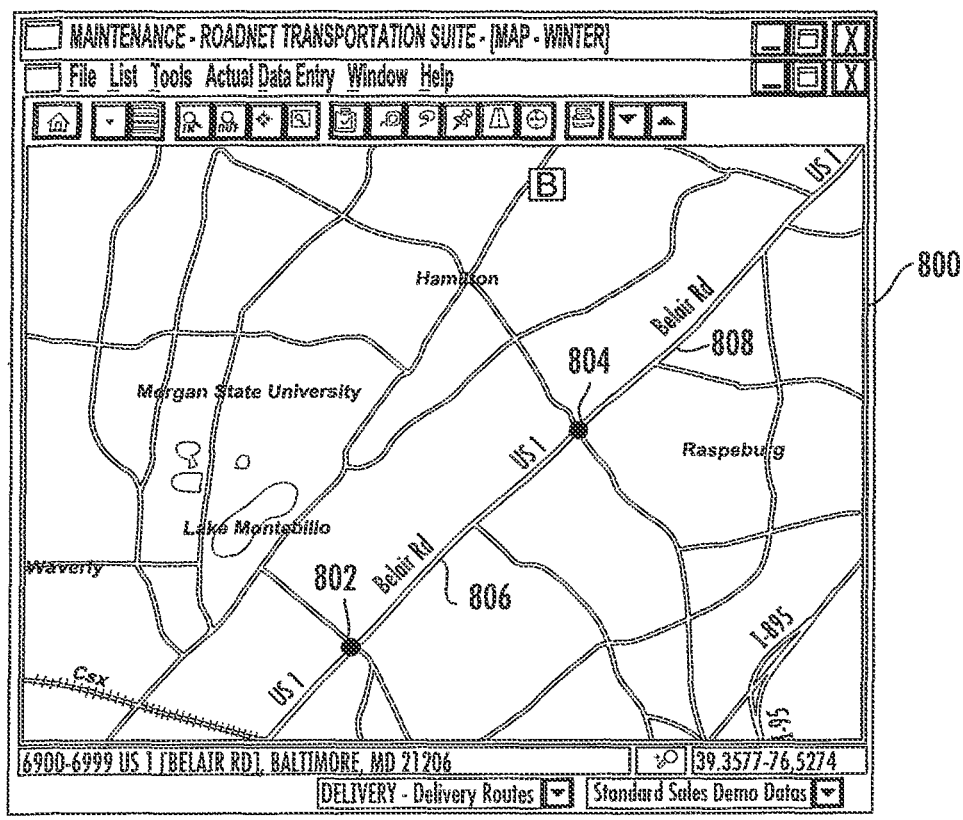

FIG. 10 is a graphic illustration of an exemplary road segment selection window.

Figure 11:
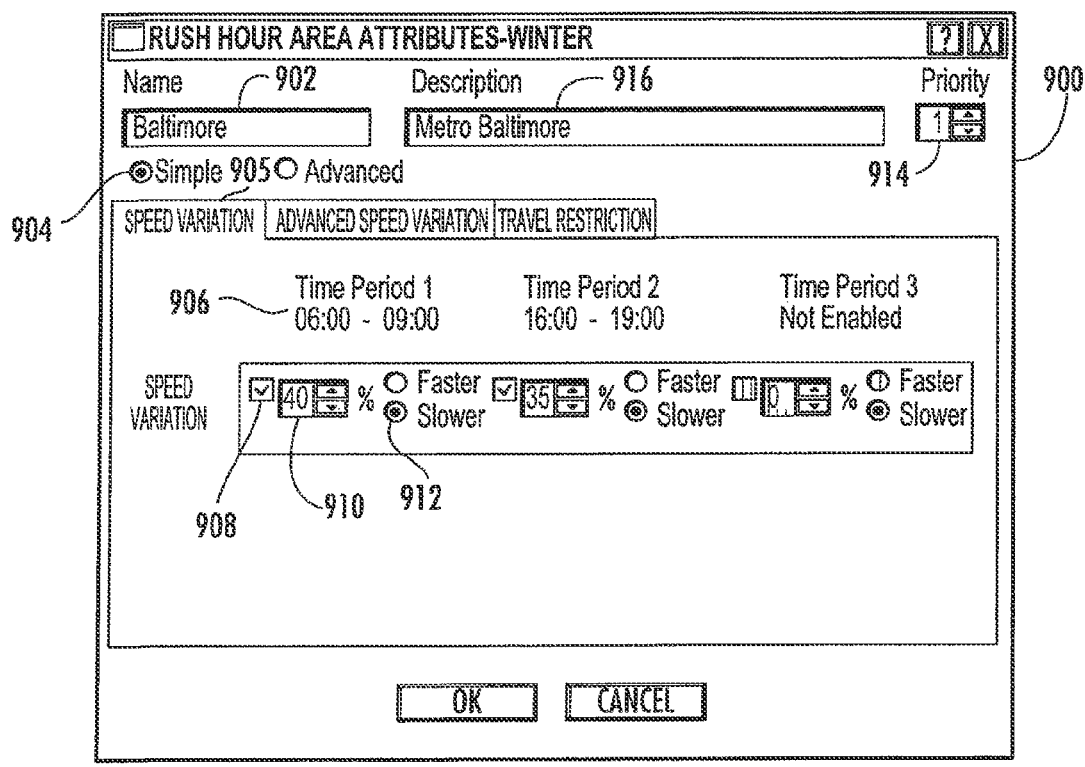

FIG. 11 is a graphic illustration of an exemplary rush hour model dialog window for defining a simple rush hour area model.

Figure 12:
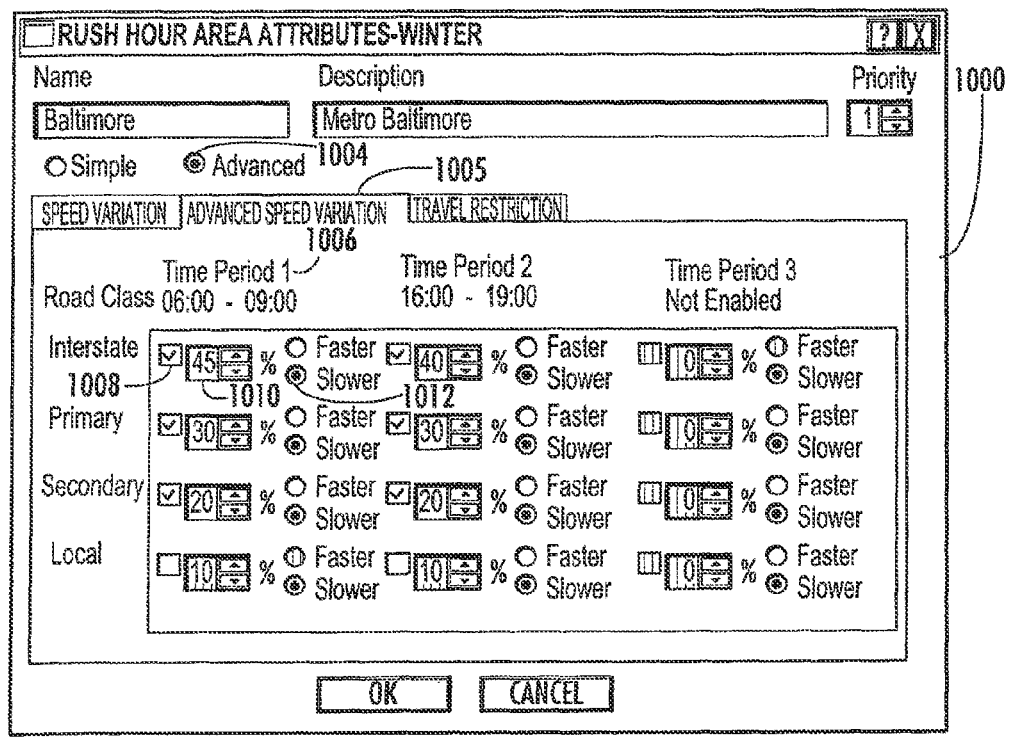

FIG. 12 is a graphic illustration of an exemplary rush hour model dialog window for defining an advanced rush hour model.

Figure 13:
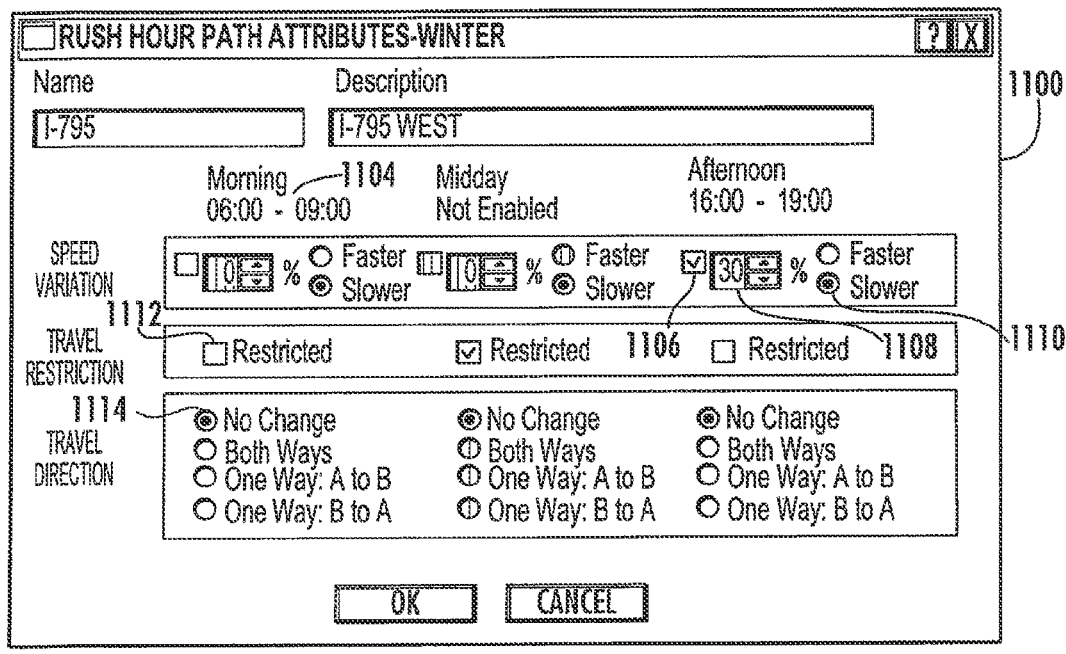

FIG. 13 is a graphic illustration of an exemplary rush hour model dialog window for defining speed variations and direction of travel restrictions for vehicles traveling during each time window on a particular road segment.

FIG. 14 is a graphic illustration of an exemplary rush hour model dialog window for defining equipment types that may be prohibited from travel in restricted rush hour areas or road segments during rush hour time periods.

FIG. 15 is a graphic illustration of an exemplary rush hour model dialog window for selecting the road type on which and time windows in which restricted equipment types may not travel.

Figure 16:
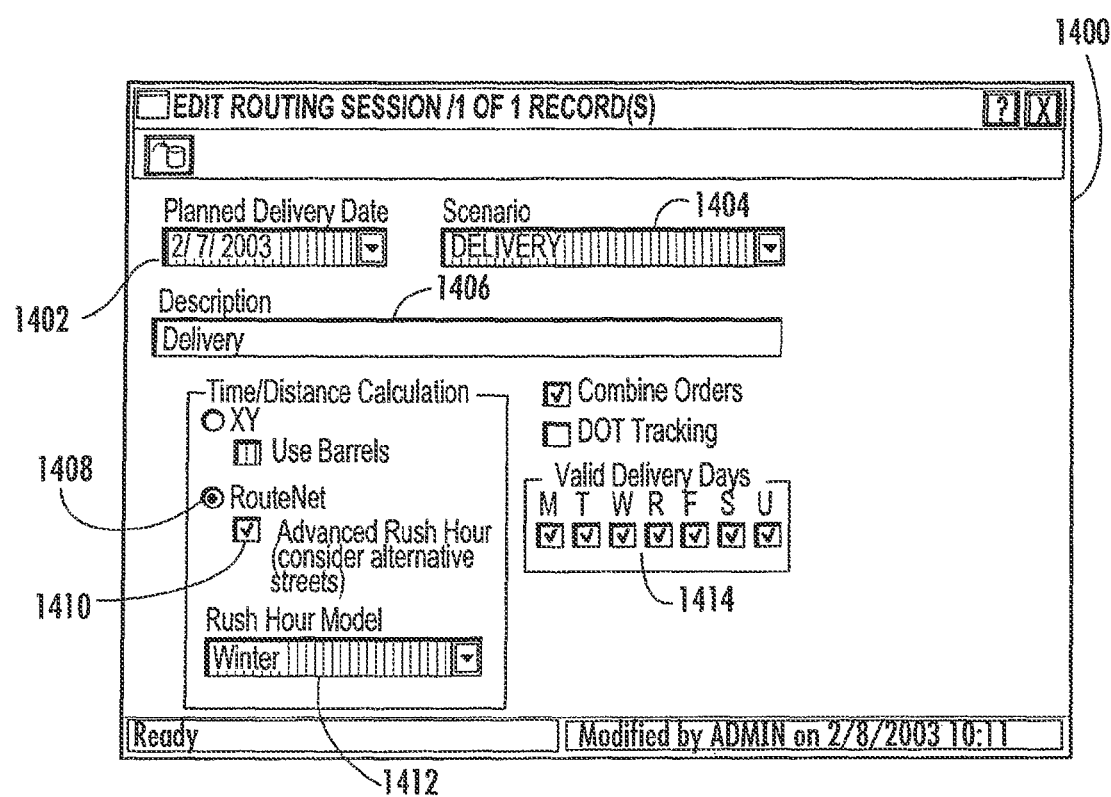

FIG. 16 is a graphic illustration of an exemplary rush hour model dialog window for selecting the routing and scheduling program that will be utilizing rush hour modeling data to route and schedule vehicles.

Figure 17:
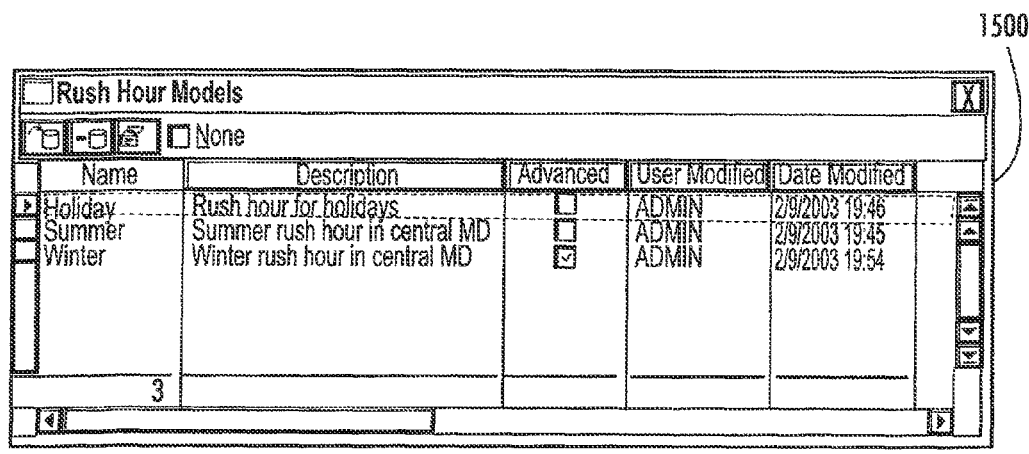

FIG. 17 is a graphic illustration of an exemplary rush hour model dialog window for viewing and selecting rush hour models previously defined according one or more embodiments of the current invention.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Brief Overview

A system according to one embodiment of the present invention creates one or more time/distance matrices (which may also referred to as "travel matrices") that reflect special traffic conditions, such as rush hour traffic conditions. In one embodiment of the invention, the system allows a user to specify a set of travel rules that define the special traffic conditions, and to then generate one or more time/distance matrices that account for these travel rules. In one embodiment of the invention, the system does this by first generating a time/distance matrix that reflects "normal" traffic conditions, and then modifying this "normal" time/distance matrix to generate one or more rush hour time/distance matrices that reflect the specified travel rules. Existing routing and scheduling systems can then use the generated time/distance matrices to plan and schedule routes for vehicles more accurately.

Travel rules specified by the user may include, for example, travel rules that indicate that traffic conditions are different from normal conditions in one or more particular time windows. Such travel rules include, for example: (1) speed variation rules that indicate that the average travel speed of vehicles within a particular geographic area or on a particular road segment is a certain percentage slower or faster than it would be under normal traffic conditions; (2) vehicle-specific travel restrictions that specify that certain types of vehicles are not allowed to travel within a particular geographic area or on a particular road segment; (3) direction of travel restrictions that specify that no vehicles are allowed to travel in a specified direction (e.g., on a particular road segment or within a particular geographic area); and (4) "no travel zone" vehicle restrictions indicating that no vehicles should be scheduled to travel within a particular geographic region or on a particular road segment. These travel rules can be defined to apply, for example: (1) to an entire geographic region; (2) to a specific geographic area within the geographic region; (3) to each geographic area of a specific type within a geographic region; (4) to all roads of a particular type of road within the geographic region; or (5) to a specific road segment within the geographic region.

FIG. 1 is a table illustrating a sample set of travel speeds generated based on a rush hour model defined by a user. These speeds are then used to generate a set of time/distance matrices that reflect the travel rules defined within the rush hour model. FIG. 2A shows a simple "normal" time/distance matrix that does not reflect a rush hour model defined by a user. FIG. 2B shows the time/distance matrix of 2A after the matrix has been modified to reflect the travel rules defined within the rush hour model reflected in FIG. 1.

As may be understood from FIGS. 2A and 2B, the distance associated with traveling between two different locations may change after the Rush Hour Model is applied to modify the "normal" time/distance matrix. This change in distance is due to the fact that the optimum path between the two locations may change based on the travel rules included in the Rush Hour Model. This change in distance is reflected in FIGS. 2A and 2B by showing that the distance between Location 1 and Location 2, which is shown in the second row of the first column of data, changes from 2 miles to 3 miles due to the application of the Rush Hour Model. Similarly, the distance between Location 2 and Location 3, which is shown in the first row of the second column of data, changes from 2 miles to 3 miles due to the application of the Rush Hour Model.

The following example illustrates how a user sets up the travel rules that are used to generate the information illustrated in FIG. 1 and the time/distance matrix shown in FIG. 2B. In the example below, the user enters the travel rules into the system via a series of graphical interfaces, and the system uses these travel rules to modify an existing "normal" time/distance matrix to generate one or more revised rush hour time/distance matrices that account for the set of rush hour travel rules specified by the user.

In the example shown, the user first specifies one or more time windows (here "Time Window #1," "Time Window #2," and "Time Window #3") in which the traffic conditions within the geographic area are to be evaluated differently from normal traffic conditions. The user then defines a geographic area ("Area 1") within a geographic region (e.g., the total geographic area in which vehicles may be routed to travel by the routing and scheduling system) by selecting points to define a polygon on a map display. The boundaries of the polygon define the boundaries of Area 1.

The user then defines how the traffic conditions for Area 1 differ from normal traffic conditions within each time window. For example, the user can specify that in Time Windows #1 and #3, the average travel speed within Area 1 is 30% slower than normal, and that in Time Window #2, the average travel speed within Area 1 is 20% slower than normal. Accordingly, the estimated travel speeds used by the system in routing and scheduling vehicles traveling within Area 1 will be reduced by 30% during Time Windows #1 and #3 and by 20% during Time Window #2.

In this example, a first road called "Road 1", which is a road located within Area 1, has a normal travel speed of 45 miles per hour (mph). Accordingly, as shown in FIG. 1, applying the user-specified travel rules above would result in the following set of map data for Road 1: (1) 31.5 mph for Time Window #1 (i.e., 30% slower than normal); (2) 36 mph for Time Window #2 (i.e., 20% slower than normal); (3) 31.5 mph for Time Window #3 (i.e., 30% slower than normal); and (4) 45 mph (i.e., the normal speed) for times outside of Time Windows #1, #2, and #3.

Similarly, a second road called "Road 2", which is also within Area 1, has a normal travel speed of 50 mph. Accordingly, applying the user-specified travel rules above would result in the following set of map data: (1) 35 mph for Time Window #1 (i.e., 30% slower than normal); (2) 40 mph for Time Window #2 (i.e., 20% slower than normal); (3) 35 mph for Time Window #3 (i.e., 30% slower than normal); and (4) 50 mph (i.e., the normal speed) for times outside of Time Windows #1, #2, and #3.

Continuing with the example shown in FIG. 1, the user also defines a first road segment, called "Road Segment X", outside of Area 1 by selecting two points on a graphical representation of the road. The user also indicates that traffic conditions on Road Segment X will be different from normal during Time Windows #1, #2, and #3. The user then defines how the conditions for Road Segment X differ from normal traffic conditions for Road Segment X in these three time windows.

For example, the user specifies that in Time Windows #1 and #3, the travel speed is 30% slower than normal. The user further designates that Road Segment X is a "no-travel zone" in Time Window #2, and that no vehicles should be scheduled to travel on Road Segment X during Time Window #2. Accordingly, in one embodiment, the system would designate the average vehicle speed on Road Segment X to be 0 mph during Time Window #2 (or another very small value to indicate that vehicles are not to be scheduled to travel on Road Segment X during Time Window #2).

Accordingly, in this example, if Road Segment X has normal travel speed of 30 mph, then the travel rules entered by the user for Road Segment X would result in the following set of map data: (1) 21 mph travel speed for Time Window #1 (i.e., 30% slower than normal); (2) 0 mph for Time Window #2 (which represents that vehicles should not be scheduled to travel on Road Segment X during Time Window #2); (3) 21 mph for Time Window #3 (i.e., 30% slower than normal); and (4) 30 mph (i.e., normal speed) for times outside of Time Windows #1, #2, and #3.

Continuing with the example shown in FIG. 1, the user then defines a second road segment outside of Area 1 called "Road Segment Y", which has a normal travel speed of 65 mph. The user then indicates that the travel rules specified above with respect to Road Segment X also apply to Road Segment Y. This results in the following set of map data: (1) 45.5 mph travel speed for Time Window #1 (i.e., 30% slower than normal); (2) 0 mph for Time Window #2 (which represents that vehicles should not be scheduled to travel on Road Segment Y during Time Window #2); (3) 45.5 mph for Time Window #3 (i.e., 30% slower than normal); and (4) 65 mph (i.e., normal speed) for times outside of Time Windows #1, #2, and #3. In this example, all other geographic areas and road segments other than those for which user-defined travel rules were specified to apply would be treated as "normal speed" areas.

When implementing one embodiment of the system, a user first enters all applicable rush hour travel rules into the system. The system then generates a "normal" time/distance matrix, which will apply to all times outside of the three (or other number of) time windows defined by the user. The system then generates a time/distance matrix for each time window defined within the Rush Hour Model. This may be understood from an example in which the Rush Hour Model includes a first set of travel rules that have been defined to apply within a 8:00 am-9:00 am time window, and a second set of travel rules that have been defined to apply within a 5:00 pm-6:00 pm. In this example, the system would generate first rush hour time/distance matrix that would apply to the 8:00 am-9:00 am time window. In one embodiment of the invention, the system would do this by modifying the data within a copy of the "normal" time/distance matrix to reflect the first set of travel rules. The system would also generate a second rush hour time/distance matrix that would apply to the 5:00 pm-6:00 pm time window. In one embodiment of the invention, the system would do this by modifying the data within a copy of the "normal" time/distance matrix to reflect the second set of travel rules. The system would also retain a copy of the "normal" time/distance matrix.

Once the travel time/distance calculation module has generated the various sets of map data, the system may implement a standard routing and scheduling module such as Roadnet 5000, Territory Planner, or Mobilecast to use the time/distance matrices generated by the system, in a manner known in the art, to schedule the routes for various vehicles according to the sets of map data. For example, in the example discussed above, the Routing and Scheduling Module would use the first rush hour time/distance matrix when calculating travel times of route segments beginning in the 8:00 am-9:00 am time window. Similarly, the Routing and Scheduling Module would use the second rush hour time/distance matrix when calculating travel times of routes segments beginning in the 5:00 pm-6:00 pm time window. The Routing and Scheduling Module would use the "normal" time/distance matrix when calculating travel times of route segments beginning outside of the 8:00 am-9:00 am and 5:00 pm-6:00 pm time windows.

The system may be used to generate several different sets of time/distance matrices, each set corresponding to a different traffic model. For example, a first set of time/distance matrices could be generated to reflect a "weekday" model specified by a user, and a second set of time/distance matrices could be generated to reflect a "weekend" model specified by a user. The appropriate set of time/distance matrices would then be used by a routing and scheduling program to schedule vehicle routes for each particular day. For example, in one embodiment of the invention, the "weekend" set of time/distance matrices would be used by the routing and scheduling program to schedule vehicle routes for weekend days, and the "weekday" set of time/distance matrices would be used by the routing and scheduling program to schedule vehicle routes for weekdays.

System Architecture

A system 5 according to one embodiment of the invention is shown in FIG. 3. As may be understood from this figure, in this embodiment, the system includes one or more user computers 10, 12 that are connected, via a network 15 (e.g., a LAN or the Internet), to communicate with a Rush Hour Modeling Server 50. In one embodiment of the invention, the Rush Hour Modeling Server 50 is configured for retrieving data from, and storing data to, a database 30 that may be stored on (or, alternatively, stored remotely from) the Rush Hour Modeling Server 50.

FIG. 4 shows a schematic diagram of a rush hour modeling server 50 according to one embodiment of the invention. The rush hour modeling server 50 includes a processor 60 that communicates with other elements within the rush hour modeling server 50 via a system interface or bus 61. Also included in the rush hour modeling server 50 is a display device/input device 64 for receiving and displaying data. This display device/input device 64 may be, for example, a keyboard or pointing device that is used in combination with a monitor. The rush hour modeling server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the rush hour modeling server 50.

In addition, the rush hour modeling server 50 includes at least one storage device 63, such as a hard disk drive, a floppy disk drive, a CD Rom drive, or optical disk drive, liar storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a rush hour model definition module 100, a travel time/distance calculation module 200, and a routing and scheduling module 300. The rush hour model definition module 100, the travel time/distance calculation module 200, and the routing and scheduling module 300 control certain aspects of the operation of the rush hour modeling server 50, as is described in more detail below, with the assistance of the processor 60 and an operating system 80.

Also located within the rush hour modeling server 50 is a network interface 74, for interfacing and communicating with other elements of a computer network. It will be appreciated by one of ordinary skill in the art that one or more of the rush hour modeling server 50 components may be located geographically remotely from other rush hour modeling server 50 components. Furthermore, one or more of the components may be combined, and additional components performing functions described herein may be included in the rush hour modeling server 50, Exemplary System Flow FIG. 5 depicts an Exemplary System Flow 90 according to one embodiment of the invention. As may be understood from this figure, in this embodiment of the invention, the system begins at Step 92 by using the Rush Hour Model Definition Module 100 to allow a user to define a rush hour model. Next, the system proceeds to Step 94 where it executes a Time/Distance Calculation Module 200 to generate a set of one or more time/distance matrices for the rush hour model defined in Step 92. In one embodiment of the invention, each of these matrices corresponds to a particular time window defined within the rush hour module. Finally, the system executes a Routing and Scheduling Module 300 (e.g., such as RoadNet 5000) to route and schedule vehicles based on the set of time/distance matrices generated in Step 96. The Rush Hour Model Definition Module 100, the Time/Distance Calculation Module 200, and the Routing and Scheduling Module 300 will now be discussed in somewhat greater detail.

Rush Hour Model Definition Module

FIG. 6 depicts a Rush Hour Model Definition Module 100 according to one embodiment of the invention. As may be understood from this figure, the system begins at Step 105 where it allows a user (e.g., a routing and scheduling technician) to define a time window in which one or more particular travel rules will apply. For example, the system may allow the user to specify that one or more travel rules will apply within a 10:00 am-11:00 am time window or a 1:00 pm-2:30 pm time window.

Next, at Step 110, the system allows a user to define a geographical area or road segment to which one or more travel rules will apply. The system may do this, for example, by presenting a map to a user (e.g., via a computer display screen) and allowing the user to select or define a particular geographical area on the map via a graphical user interface. For example, the system may allow the user to define a particular geographic area by: (1) defining three or more points on a map that define a polygon; (2) defining a center point on the map along with a radius that, together with the defined center point, defines a circle; (3) defining a series of contiguous arcs that define an enclosed geographical area; or (4) selecting a pre-defined area (e.g., a city, a zip code, astute, or a particular subdivision). As will be understood by one skilled in the art in light of this disclosure, the system may also be configured to allow users to define geographical areas using a variety of other suitable techniques known in the art.

In one embodiment of the invention, the system allows users to select a particular road segment by, for example: (1) selecting a road from a visual map display on a computer; (2) selecting two points on a road displayed on a map; (3) selecting one point on a road displayed on a map along with a direction and length of the road to be included within the road segment; or (4) defining an externally predefined road (e.g., a segment of a road defined by two intersections, an address range, or a zip code range).

After the system allows the user to define a geographical area or road segment at Step 110, the system proceeds to Step 115 where it allows the user to define one or more travel rules to be applied to the defined geographical area or road segment within the specified time window. One example of such a travel rule is a speed variation rule (e.g., a rule that specifies that traffic on the defined road segment or within the defined geographical area should be modeled as being slower or faster than normal by a specified amount).

Another example of a travel rule is a direction of travel restriction, which serves to restrict scheduling vehicles to travel in a specified direction within the defined geographical area or on the defined road segment. For example, the system may allow a user to specify that, during the defined time window, vehicles should not be scheduled to travel north between Exit 100 and Exit 120 on I-85.

A further example of a travel rule is a vehicle-specific restriction. This type of travel rule may serve to restrict or limit travel by certain types of vehicles within the defined geographical area or on the defined road segment within the defined time window. Such vehicle-specific restrictions may be based, for example, on the class, type, weight, size, capacity, or function of the vehicle. For example, a user may specify that no vehicles having more than ten wheels should be scheduled to travel within the defined geographic area or on the defined road segment during the defined time window. In this example, vehicles that have more than ten wheels will not be scheduled to travel within the defined geographic area or on the defined road segment during the defined time window.

Yet another example of a travel rule is a no-travel-zone restriction. In one embodiment of the invention, such restrictions specify that no vehicles are to be scheduled to travel within the defined geographical area or on the defined road segment within the specified time window.

After the user defines the travel rules at Step 115, the user may repeat Steps 105-115 to define additional time traffic-related rules ("travel rules") that are to form part of the current Rush Hour Model. An exemplary, short Rush Hour Model including six different traffic-related rules is shown in the table below.

| Geographic Areas | Time Window 1: 9:00 am to 11:00 am | Time Window 2: 12:00 pm to 2:00 pm | Time Window 3: 6:00 pm to 7:00 pm |
|---|---|---|---|
| Zip Code 30309 | 30% slower | 20% slower | 30% slower |

-continued

| Geographic Areas | Time Window 1: 9:00 am to 11:00 am | Time Window 2: 12:00 pm to 2:00 pm | Time Window 3: 6:00 pm to 7:00 pm |
|---|---|---|---|
| Zip Code 30030 | 20% slower | Normal Speeds | Vehicle-Based Restriction |

It should be understood that the Rush Hour Model Definition Module 100 shown in FIG. 6 may be expanded to include additional steps or that various steps may be removed in accordance with different embodiments of the invention.

In one embodiment, the Rush Hour Model Definition Module 100 includes the additional step of allowing a user to associate a priority factor with each travel rule. As discussed below, this priority factor provides a basis by which the system can determine which particular travel rule to apply for a particular geographic region or road segment if two travel rules have been defined to apply to that particular geographic region or road segment during the same time window. Examples of priority factors include allowing the user to associate a priority number to each travel rule, specifying that the travel time/distance calculation module 200 should apply the travel rule associated with the first geographic area created, or specifying that the travel time/distance calculation module 200 should apply the travel rule associated with the road segment when a travel rule associated with a road segment conflicts with a travel rule associated with a geographic area.

The Rush Hour Model Definition Module 100 may also include the step of allowing a user to specify that a particular traffic-related rule should apply to all geographic areas of a particular class. Such classes of geographic areas may be defined in any appropriate way. For example, such classes of geographic areas may include: (1) urban; (2) rural; (3) suburban; (4) residential; (5) commercial; (6) high traffic area; (7) medium traffic area; and/or (8) low traffic area. In one embodiment of the invention, the Rush Hour Model Definition Module 100 is also configured to allow a user to specify the class of a particular geographic area or road segment rather than defining a specific travel rule that should apply to that geographic area or road segment. In one embodiment, the system will then automatically apply any travel rules associated with the specified class of geographic area or road to that particular geographic area or road segment. This embodiment reduces the amount of work associated with setting up and modifying travel rules for groups of similar geographic areas or road segments.

Travel Time/Distance Calculation Module

An exemplary travel time/distance calculation module 200 is shown in FIG. 7. As may be understood from this figure, in one embodiment of the invention, the travel time/distance calculation module 200 begins at Step 205 where it receives a rush hour model defined by a user. Next, the system proceeds to Step 210 where it generates a "normal" time/distance matrix based on a set of map data in a manner known in the relevant field.

The system then proceeds to Step 215, where generates a time/distance matrix for each time window defined within the Rush Hour Model. This may be understood from an example in which the Rush Hour Model includes a first set of travel rules that have been defined to apply within a 8:00 am-9:00 am time window, and a second set of travel rules that have been defined to apply within a 5:00 pm-6:00 pm. In this example, the system would generate a first rush hour time/distance matrix that would apply to the 8:00 am-9:00 am time window. In one embodiment of the invention, the system would do this by modifying the data within a copy of the "normal" time/distance matrix to reflect the first set of travel rules. The system would also generate a second rush hour time/distance matrix that would apply to the 5:00 pm-6:00 pm time window. In one embodiment of the invention, the system would do this by modifying the data within a copy of the "normal" time/distance matrix to reflect the second set of travel rules. The system would also retain a copy of the "normal" time/distance matrix generated at Step 210.

In one embodiment of the invention, when generating the various rush hour time/distance matrices at Step 215, the system is configured to determine whether two or more travel rules have been defined to apply to a particular road segment or geographical area at the same time (e.g., in the same time window) and, if so, to determine which of the travel rules should apply to that particular road segment or geographical area. For example, the system may determine whether, for a particular time window, a user has defined a first geographical area associated with a first travel rule to overlap with a second geographical area associated with a second travel rule during the same period of time. If so, the system determines that two more travel rules have been defined to cover a particular graphical area at the same time.

In one embodiment of the invention, if the system determines that two or more travel rules have been defined to apply to a particular road segment or geographical area at the same time, the system uses priority factors associated with each of the two or more applicable travel rules to deter which travel rule should apply to the particular "overlapped" road segment or geographical area. As noted above, these priority factors may be assigned to each travel rule during execution of the Rush Hour Model Definition Module 100. For example, the user may be asked to assign a numerical priority factor to each travel rule defined within the Rush Hour Model Definition Module 100. The system would then compare these priority factors at Step 220 to determine which travel rule should apply to the particular "overlapped" road segment or geographical area. In one embodiment of the invention, the travel rule with the higher priority factor would be applied to the particular "overlapped" road segment or geographical area. In another embodiment of the invention, a road segment travel rule will always be given priority aver a travel rule associated with a geographic area.

In an alternative embodiment, travel time/distance calculation module 200 will generate an error message if the user defined a geographic area or road segment to overlap at least a portion of another geographic area or road segment in Rush Hour Model Definition Module 100. In this embodiment, the user may be allowed to provide instructions as to which travel rules should be applied in response to the error message. Alternatively, the user may not be allowed to provide instructions as to which travel rules should be applied in response to the error message. In this alternative embodiment, the user may be prompted to redefine one of the geographic areas or road segments so it does not overlap another geographic area or road segment.

Routing and Scheduling Module

Once the travel time/distance calculation module 200 has generated the various sets of time/distance matrices, the system may implement a standard routing and scheduling module 300 such as Roadnet 5000, Territory Planner, or Mobilecast to use the time/distance matrices generated at Step 215, in a manner known in the art, to schedule the routes for various vehicles according to the sets of time/distance matrices. For example, in the example discussed above in regard to the Travel Time/Distance Calculation Module 200, the Routing and Scheduling Module 300 would use the first rush hour time/distance matrix when calculating travel times of route segments beginning in the 8:00 am-9:00 am time window. Similarly, the Routing and Scheduling Module 300 would use the second rush hour time/distance matrix when calculating travel times of route segments beginning in the 5:00 pm-6:00 pm time window. The Routing and Scheduling Module 300 would use the "normal" time/distance matrix when calculating travel times of route segments beginning outside of the 8:00 am-9:00 am and 5:00 pm-6:00 pm time windows.

Operation of the System According to a Preferred Embodiment

To use a system according to a preferred embodiment of the invention, a user first defines one or more time windows in which special traffic conditions affect travel speeds. The time windows may be defined as described above in reference to the Rush Hour Model Definition Module 100 of FIG. 6. An exemplary rush hour dialog window 600 for defining time windows and global speed variations according to a preferred embodiment is shown in FIG. 8. The user can select whether to enable each time window for the particular rush hour model by toggling the check box 606 associated with each time window. After a time window is enabled, the user can enter a start time 610 and an end time 612 for the time window in the text boxes or by selecting the up or down scroll boxes to increase or decrease the time. Although this preferred embodiment is shown with three time windows from which to choose, the system could provide more or less time windows, depending on the needs of the system.

As may be understood from FIG. 8, the user can also enter a name 602 for the rush hour model, attribute a description 604 to the rush hour model, and enter a descriptive name 608 for the time period by typing in the appropriate text box. Furthermore, the user can select and define a global speed variation to apply to the map data as a whole for each time window. The user can enable a global speed variation by toggling the check box 614 associated with the global speed variation definition for a particular time window. When the global speed variation is enabled, the user can enter the percentage faster or slower of travel speeds for vehicles traveling anywhere within the map region during the time window. This percentage amount may be entered into the text box 616 associated with the global speed variation setting or selected by scrolling up or down within the text box. Then, the user toggles the radio button 618 associated with "Faster" or "Slower" depending on how the percentage is to affect the normal travel speeds for the map region.

If the user does not select a global speed variation fir the time window, then the map data for the region is not subject to a global speed variation during the time window. However, as is discussed in more detail below, portions of the map data may be subject to either no travel rule or travel rules that are defined for specific geographic areas or road segments.

The user then defines one or more geographic areas within the map region. As may be understood from an exemplary geographic area selection window 700 in FIG. 9, the user can select points 702 on a map 706 to form a polygon, the boundaries of which define a geographic area 704. The user may later subject the defined geographic area 704 to a particular ravel rule that models traffic conditions in that geographic area during a time window. Defining geographic areas and characterizing traffic conditions during a time window within each area allows the user to model traffic conditions in the areas more accurately than by applying global speed variations to map data covering an entire region.

Alternatively, or in addition to defining a geographic area, the user may define one or more road segments within a map region to which rush hour models can be applied. As shown in an exemplary road segment selection window 800 shown in FIG. 10, the road segment is selected by choosing two points 802, 804 on a road 808 to define a road segment 806.

The user then chooses the travel rules to be applied to each geographic area or road segment during a particular time window. As discussed above in relation to Rush Hour Model Definition Module 100 in FIG. 6, examples of travel rules include speed variation models and vehicle-based restrictions Travel rules may also include simple speed variation models that apply to the entire geographic area and advanced speed variation models that limit the applicability of travel rules within the geographic area. FIGS. 11, 12, 13, 14 and 15 show exemplary dialog windows for defining travel rules for each geographic area or road segment.

As may be understood from the exemplary rush hour dialog window 900 in FIG. 11, the user may define a simple speed variation model. The user can name the rush hour model 902 and enter a description 916 in the text boxes provided. To define a simple speed variation model, the user can select the radio button 904 for "Simple" or the "Speed Variation" tab 905 in the window 900. Each enabled time window 906 is shown, and the user can select and define a speed variation model for each time window. The user toggles the check box 908 under each time window in which the user desires to define a speed variation model. Then the user enters a percentage of travel time 910, faster, or slower, that vehicles traveling within the geographic area can expect to travel, and the user toggles the appropriate "Faster" or "Slower" radio button 912. Additionally, the user may also designate the priority of the travel rule defined by entering the priority number into the text box 914 or selecting the scroll buttons up or down.

As may be understood from the exemplary rush hour dialog window 1000 in FIG. 12, the user may define an advanced speed variation model. To define an advanced speed variation model, the user can toggle the "Advanced" radio button 1004 or select the "Advanced Speed Variation" tab 1005. Each enabled time window 1006 is shown, and the user can select and define a speed variation model for each time window based on road class. The user toggles the check box 1008 across from each road class and under each time window in which the user wants to define a speed variation model. The percentage faster or slower is entered into the scroll/text box 1010, and the "Faster" or "Slower" radio button 1012 is selected. Although this preferred embodiment includes interstate, primary, secondary, and local road classes, the system could provide more or less classes of roads or different classes of roads, depending on the needs of the system. Furthermore, road class is only an example of the type of additional limitation placed on a speed variation model; other types of limitations are contemplated, such as speed variation models for specific types of vehicles and speed variation models for specific directions of travel.

As may be understood from the exemplary rush hour dialog window 1100 of FIG. 13, the user may define direction of travel restrictions and speed variations for vehicles traveling on a particular road segment. For each enabled time window 1104, the user selects whether a travel restriction should be applied by toggling the check box 1112 across from "Travel Restriction" and under each time window in which a restriction will be applied. Then the user toggles the radio button 1114 for the direction of travel in which the user wants to restrict travel. The radio button options shown include "No Change," "Both Ways," "One Way: A to B," and "One Way: B to A." If the user selects "No Change," then vehicles traveling on the road segment are not subject to a direction of travel restriction. If the user selects "Both Ways," vehicles are not allowed to be scheduled to travel on the road segment during the time window in any direction. If the user selects "One Way: A to B," vehicles are not allowed to be schedule to travel in a direction from point A towards point B during the time window. Similarly, if the user selects "One Way: B to A," vehicles are not allowed to be scheduled to travel in a direction from point B to point A during the time window. Reference points A and B can be selected by the user when defining the road segment or at some other step in the Rush Hour Model Definition Module 100.

According to the rush hour dialog window 1100 shown in FIG. 13, if the user selects "No Change" for a particular time window, the user may define a speed variation for the time window. The user can select the check box 1106 for a enabling a time window and enter a percentage faster or slower to define the speed variation 1108, 1110.

As may be understood in exemplary rush hour dialog window 1200 of FIG. 14, the user may define vehicle-based restrictions such as equipment restrictions. The user may define an equipment type that the user may later specify as subject to travel restrictions. Under the "General" tab 1201, the user can enter a description of the equipment type in the text box 1204 labeled "Description." The user can also enter general information about the equipment such as weight, height, and cost information about the equipment. These values are input into the text boxes 1206 below each corresponding label. In addition, the user can specify equipment type 1212 by the size and type of load carried by the equipment. Once the equipment type is defined, the user can toggle the check box 1210 at the bottom of the dialog box to indicate whether the equipment type should be prohibited from certain specified restricted rush hour geographic areas and road segments.

Using the exemplary rush hour dialog window 1300 shown in FIG. 15, the user defines the circumstances under which the vehicle-based restriction applies to equipment types defined in relation to FIG. 14. For example, in FIG. 15 under each enabled time window 1308, travel on primary, secondary, and local roads can be restricted for the restricted equipment types by toggling the check box 1310 across from each road class. Alternatively, the user can select the "All" 1312 button below each time window to restrict vehicles of the restricted type from traveling on all roads during the time window. In another alternative embodiment, not shown in the figures, the user can choose the specific types of vehicle-based restrictions that should be restricted for a type of road segment or geographic area. Additionally, the user can choose the specific types of vehicle-based restrictions that should be restricted for a particular road segment or geographic area.

As may be understood by the exemplary rush hour model dialog window 1400 shown in FIG. 16, the user may specify which particular routing and scheduling system to use to route and schedule vehicles. The user can enter the planned delivery date into a text box 1402 or choose from available dates with the drop down box function. Additionally, the user can specify the scenario for the route 1404 (e.g., delivery or pick-up) and specify a description 1406 for the routing session by entering it into a text box. The user then toggles the radio button 1408 for the routing and scheduling system that the user wants to use—either the XY program or RouteNet. If, for example, RouteNet is selected, the user can toggle the "Advanced Rush Hour" check box 1410 to instruct the system to consider alternative streets when scheduling a route. The user then selects the rush hour model for the routing and scheduling system to use by choosing from those available in a drop down box 1412. The dialog window 1400 shown in FIG. 16 also allows the user to toggle the check box 1414 associated with each day that the user wants the system to schedule routes.

As shown in FIG. 17, the user can view and select rush hour models previously defined in an exemplary rush hour model dialog window 1500. The user can view which models have been defined, the date on which the model was last modified, and whether the model includes advanced speed variation models. Furthermore, the window allows the user to select a rush hour model for editing.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

That which is claimed:

1. A computer readable medium storing computer-executable instructions for:
   processing data defining boundaries of a first geographic area and a first travel rule that is associated with the first geographic area, the first travel rule modeling traffic conditions within the first geographic area during a first time window;
   processing data defining boundaries of a second geographic area at least partially overlapping the first geographic area, wherein an area within both the first geographic area and the second geographic area defines an overlapped geographic area;
   processing a second travel rule that is associated with the second geographic area, the second travel rule modeling traffic conditions within the second geographic area during a second time window;
   processing the first time window and the second time window to determine that the first time window and the second time window overlap at least in part;
   determining whether the first travel rule or the second travel rule should be applied to one or more vehicles traveling through at least a portion of the overlapped geographic area;
   applying the first travel rule or the second travel rule based on the step of determining.

2. The computer readable medium storing computer-executable instructions of claim 1, wherein the first travel rule defines at least one of a speed parameter, vehicle-specific restriction parameter, a direction of travel parameter and a travel-restriction zone parameter.

3. The computer readable medium storing computer-executable instructions from claim 1 further for:
   receiving user input from a user describing the data defining boundaries of the first geographic area and the second geographic area, the first travel rule, and the second travel rule.

4. The computer readable medium storing computer-executable instructions from claim 3 further for:
   generating an interactive user interface for receiving the user input, wherein the user input is received from user interaction with the interactive user interface to define the data.

5. The computer readable medium storing computer-executable instructions from claim 1, wherein the first travel rule or the second travel rule is applied to model traffic conditions for one or more vehicles traveling through at least a portion of the overlapped geographic area during the same time window.

6. The computer readable medium storing computer-executable instructions from claim 1, wherein the first travel rule or the second travel rule is applied to determine whether to schedule a route for one or more vehicles through at least a portion of the overlapped geographic area.

7. The computer readable medium storing computer-executable instructions from claim 1, wherein the first travel rule or the second travel rule is applied to schedule a route for one or more vehicles through at least a portion of the overlapped geographic area.

8. The computer readable medium storing computer-executable instructions from claim 1, wherein the first travel rule or the second travel rule is applied according to at least one of a planned delivery date and a delivery scenario.

9. The computer readable medium storing computer-executable instructions from claim 1, wherein the step of determining includes a step of processing priority factors to determine whether the first travel rule or the second travel rule should be applied.

10. The computer readable medium storing computer-executable instructions from claim 9, wherein the priority factors include a creation date of at least one of the geographic area and the travel rule.

11. The computer readable medium storing computer-executable instructions from claim 9, wherein the priority factors include a priority number associated with at least one of the geographic area and the travel rule.

12. The computer readable medium storing computer-executable instructions of claim 9, wherein processing the priority factors comprise applying a third travel rule that is associated with a road segment when the third travel rule conflicts with a fourth travel rule, the fourth travel rule being associated with a geographic area.

13. The computer readable medium storing computer-executable instructions from claim 1 further for:
receiving data defining boundaries of a third geographic area at least partially overlapping the first geographic area and the second geographic area, wherein the overlapped geographic area is defined by a second area within the first geographic area, the second geographic area, and the third geographic area;
receiving a third travel rule that is associated with the third geographic area, the third travel rule modeling traffic conditions within the third geographic area and during a third time window;
wherein the processing further comprises additionally processing the third time window while the first time window and the second time window to determine that the first time window, the second time window and the third time window overlap;
wherein the determining further comprises determining whether the first travel rule, the second travel rule, or the third travel rule should be applied to one or more vehicles traveling through at least a portion of the overlapped geographic area;
wherein the applying further comprises applying the first travel rule, the second travel rule or the third travel rule in response to the determining.

14. A computer readable medium storing computer-executable instructions for:
receiving data defining boundaries of a first road segment and a first travel rule that is associated with the first road segment, the first travel rule modeling traffic conditions within the first road segment during a first time window;
receiving data defining boundaries of a second road segment at least partially overlapping the first road segment, wherein an area within both the first road segment and the second road segment defines an overlapped geographic area;
receiving a second travel rule that is associated with the second road segment, the second travel rule modeling traffic conditions within the second road segment during a second time window;
processing the first time window and the second time window to determine that the first time window and the second time window overlap at least in part;
determining whether the first travel rule or the second travel rule should be applied to one or more vehicles traveling through at least a portion of the overlapped geographic area;
applying the first travel rule or the second travel rule based on the step of determining.

15. The computer readable medium storing computer-executable instructions from claim 14 further for:
receiving data defining boundaries of a first geographic area at least partially overlapping the first road segment and the second road segment, wherein the overlapped geographic area is defined by a second area within the first road segment, the second road segment, and the first geographic area;
receiving a third travel rule that is associated with the first geographic area, the third travel rule modeling traffic conditions within the first geographic area and during a third time window;
wherein the processing further comprises additionally processing the third time window with the first time window and the second time window to determine that the first time window, the second time window and the third time window overlap;
wherein the determining further comprises determining whether the first travel rule, the second travel rule, or the third travel rule should be applied to one or more vehicles traveling through at least a portion of the overlapped geographic area;
wherein the applying further comprises applying the first travel rule, the second travel rule or the third travel rule in response to the determining.

16. The computer readable medium storing computer-executable instructions from claim 14 further for:
receiving data defining boundaries of a third road segment at least partially overlapping the first road segment and the second road segment, wherein the overlapped geographic area is defined by a second area within the first road segment, the second road segment, and the third road segment defines;
receiving a third travel rule that is associated with the third road segment, the third travel rule modeling traffic conditions within the third road segment and during a third time window;
wherein the processing further comprises additionally processing the third time window with the first time window and the second time window to determine that the first time window, the second time window and the third time window overlap;

wherein the determining further comprises determining whether the first travel rule, the second travel rule, or the third travel rule should be applied to one or more vehicles traveling through at least a portion of the overlapped geographic area;

wherein the applying further comprises applying the first travel rule, the second travel rule or the third travel rule in response to the determining.

17. The computer readable medium storing computer-executable instructions of claim 14, wherein the first travel rule is at least one of:
   a rule defining speed variation rule;
   a vehicle-specific travel restriction rule;
   a direction of travel restriction rule; and
   a no travel zone rule.

18. The computer readable medium storing computer-executable instructions from claim 14 further for:
   receiving user input from a user describing the data defining boundaries of the first geographic area and the second geographic area, the first travel rule, and the travel rule.

19. The computer readable medium storing computer-executable instructions from claim 18 further for:
   generating an interactive user interface for receiving the user input, wherein the user input is received from user interaction with the interactive user interface to define the data.

20. The computer readable medium storing computer-executable instructions from claim 14, wherein the first travel rule or the second travel rule is applied to model traffic conditions for one or more vehicles traveling through at least a portion of the overlapped geographic area during the same time window.

21. The computer readable medium storing computer-executable instructions from claim 14, wherein the first travel rule or the second travel rule is applied to determine whether to schedule a route for one or more vehicles through at least a portion of the overlapped geographic area.

22. The computer readable medium storing computer-executable instructions from claim 14, wherein the first travel rule or the second travel rule is applied to schedule a route for one or more vehicles through at least a portion of the overlapped geographic area.

23. The computer readable medium storing computer-executable instructions from claim 14, wherein the first travel rule or the second travel rule is applied according to at least one of a planned delivery date and a delivery scenario.

24. The computer readable medium storing computer-executable instructions from claim 14, wherein the step of determining includes a step of processing priority factors to determine whether the first travel rule or the second travel rule should be applied.

25. The computer readable medium storing computer-executable instructions from claim 24, wherein the priority factors include a creation date of at least one of the geographic area and the travel rule.

26. The computer readable medium storing computer-executable instructions from claim 24, wherein the priority factors include a priority number associated with at least one of the geographic area and the travel rule.

27. The computer readable medium storing computer-executable instructions of claim 24, wherein processing the priority factors comprise applying a third travel rule that is associated with a road segment when the third travel rule conflicts with a fourth travel rule, the fourth travel rule being associated with a geographic area.

28. A method of applying a plurality of travel rules associated with one or more geographic areas, the method comprising the steps of:
   receiving, at computer processing components, data associated with a first geographic area and a first travel rule that is associated with the first geographic area, the first travel rule modeling traffic conditions within the first geographic area during a first time window;
   receiving, at the computer processing components, data associated with a second geographic area at least partially overlapping the first geographic area, wherein an area within both the first geographic area and the second geographic area defines an overlapped geographic area;
   storing, in computer memory, the data associated with the first geographic area and the second geographic area;
   receiving a second travel rule that is associated with the second geographic area, the second travel rule modeling traffic conditions within the second geographic area during a second time window;
   processing, using the computer processing components, the first time window and the second time window to determine that the first time window and the second time window overlap at least in part;
   determining whether the first travel rule or the second travel rule should be applied to one or more vehicles traveling through at least a portion of the overlapped geographic area;
   applying the first travel rule or the second travel rule based on the step of determining.

29. The method of claim 28, further comprising the steps of:
   receiving, at the computer processing components, data associated with a third geographic area at least partially overlapping the first geographic area and the second geographic area, wherein the overlapped geographic area is defined by a second area within the first geographic area, the second geographic area, and the third geographic area;
   receiving a third travel rule that is associated with the third geographic area, the third travel rule modeling traffic conditions within the third geographic area and during a third time window;
   wherein the processing further comprises additionally processing the third time window with the first time window and the second time window to determine that the first time window, the second time window and the third time window overlap;
   wherein the determining further comprises determining whether the first travel rule, the second travel rule, or the third travel rule should be applied to one or more vehicles traveling through at least a portion of the overlapped geographic area;

wherein the applying further comprises applying the first travel rule, the second travel rule or the third travel rule in response to the determining.

30. The method of claim 28, wherein at least one of the first geographic area and the second geographic area is a road segment.

* * * * *